United States Patent
Nam et al.

(10) Patent No.: US 10,609,374 B2
(45) Date of Patent: Mar. 31, 2020

(54) METHOD AND APPARATUS FOR ENTROPY-ENCODING AND ENTROPY-DECODING VIDEO SIGNAL

(71) Applicant: LG ELECTRONICS INC., Seoul (KR)

(72) Inventors: Junghak Nam, Seoul (KR); Jin Heo, Seoul (KR); Seungwook Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 8 days.

(21) Appl. No.: 15/777,847

(22) PCT Filed: Nov. 22, 2016

(86) PCT No.: PCT/KR2016/013458
§ 371 (c)(1),
(2) Date: May 21, 2018

(87) PCT Pub. No.: WO2017/086765
PCT Pub. Date: May 26, 2017

(65) Prior Publication Data
US 2018/0338144 A1 Nov. 22, 2018

Related U.S. Application Data

(60) Provisional application No. 62/258,515, filed on Nov. 22, 2015, provisional application No. 62/258,517, filed on Nov. 22, 2015.

(51) Int. Cl.
*H04N 19/13* (2014.01)
*H04N 19/91* (2014.01)
*H04N 19/176* (2014.01)
*H04N 19/70* (2014.01)
(Continued)

(52) U.S. Cl.
CPC .......... *H04N 19/13* (2014.11); *H04N 19/149* (2014.11); *H04N 19/174* (2014.11); *H04N 19/176* (2014.11); *H04N 19/70* (2014.11); *H04N 19/91* (2014.11)

(58) Field of Classification Search
None
See application file for complete search history.

(56) References Cited

U.S. PATENT DOCUMENTS

2012/0163448 A1 6/2012 Zheng et al.
2012/0314760 A1 12/2012 He
(Continued)

FOREIGN PATENT DOCUMENTS

EP 2945383 A1 5/2015
KR 10-2006-0109239 A 10/2006
(Continued)

*Primary Examiner* — Talha M Nawaz
(74) *Attorney, Agent, or Firm* — Dentons US LLP

(57) ABSTRACT

The present invention provides a method of performing an entropy decoding for a video signal including obtaining a context model initial value for a current slice; calculating a probability value based on syntax statistics of a previous slice; deriving weighted values corresponding to the context model initial value for the current slice and the syntax statistics of the previous slice; and updating the context model initial value for the current slice using the weighted values.

4 Claims, 22 Drawing Sheets

(51) Int. Cl.
*H04N 19/174* (2014.01)
*H04N 19/149* (2014.01)

(56) References Cited

U.S. PATENT DOCUMENTS

| | | | |
|---|---|---|---|
| 2012/0328003 A1* | 12/2012 | Chien | H04N 19/176 |
| | | | 375/240.03 |
| 2013/0114691 A1* | 5/2013 | Guo | H03M 7/4018 |
| | | | 375/240.03 |
| 2015/0334425 A1* | 11/2015 | He | H04N 19/91 |
| | | | 375/240.03 |

FOREIGN PATENT DOCUMENTS

| | | |
|---|---|---|
| KR | 10-2014-0022042 A | 2/2014 |
| WO | 2013067156 A1 | 5/2013 |
| WO | 2015-057036 A1 | 10/2014 |

\* cited by examiner

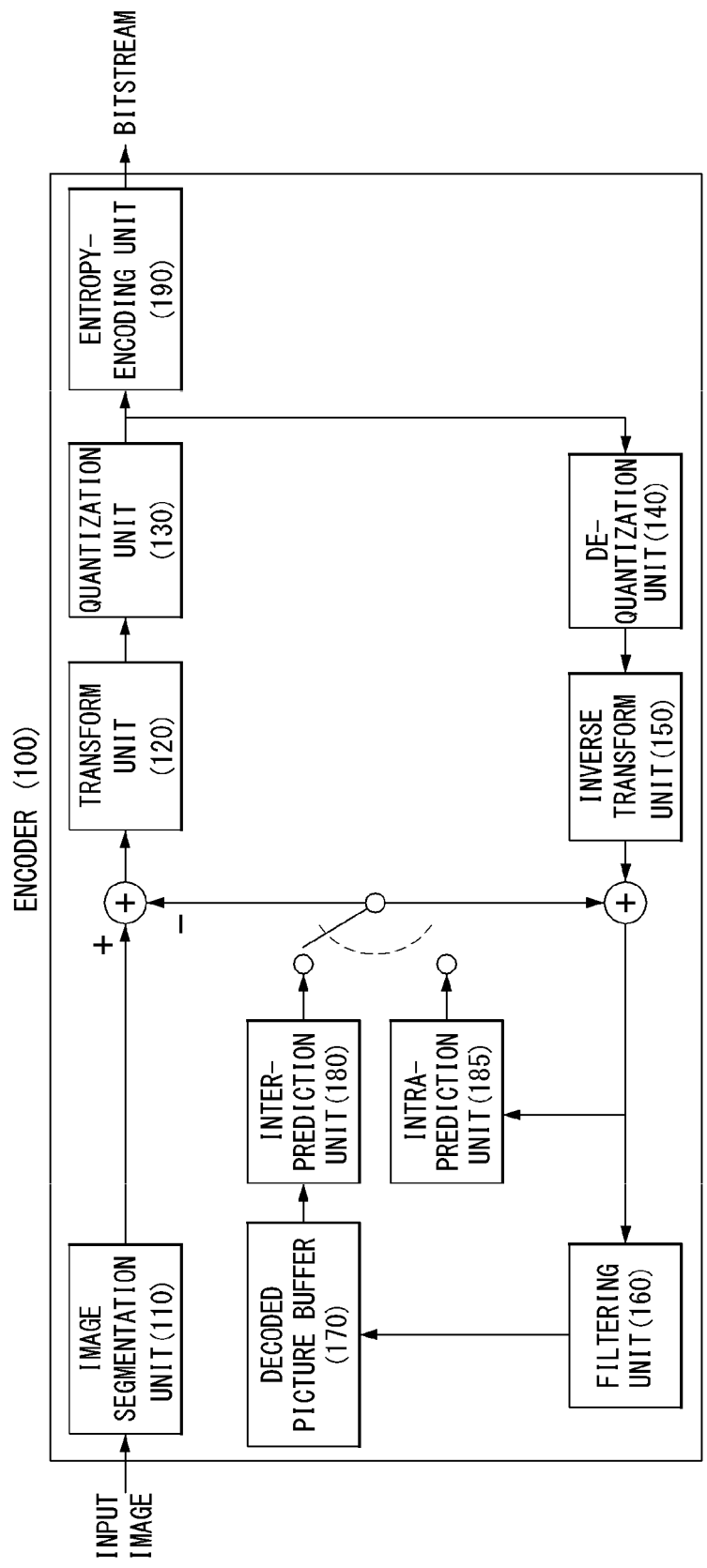
[FIG. 1]

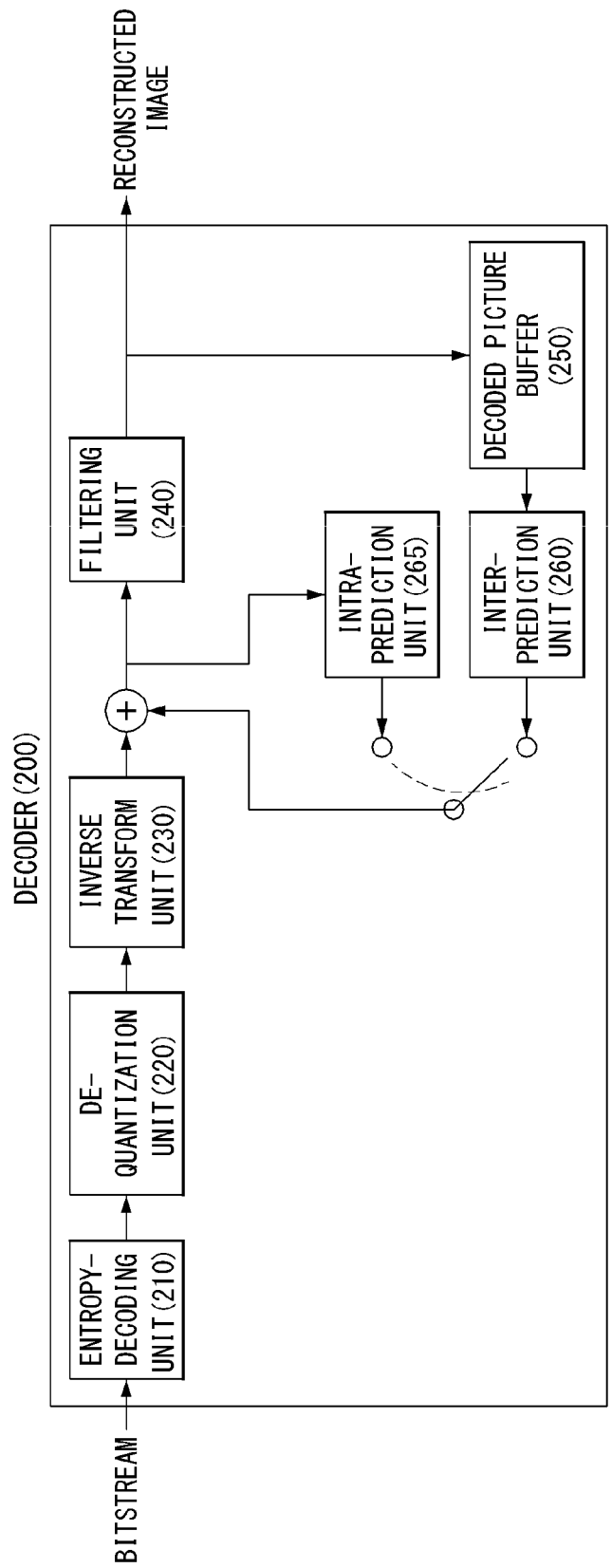
[FIG. 2]

[FIG. 3]
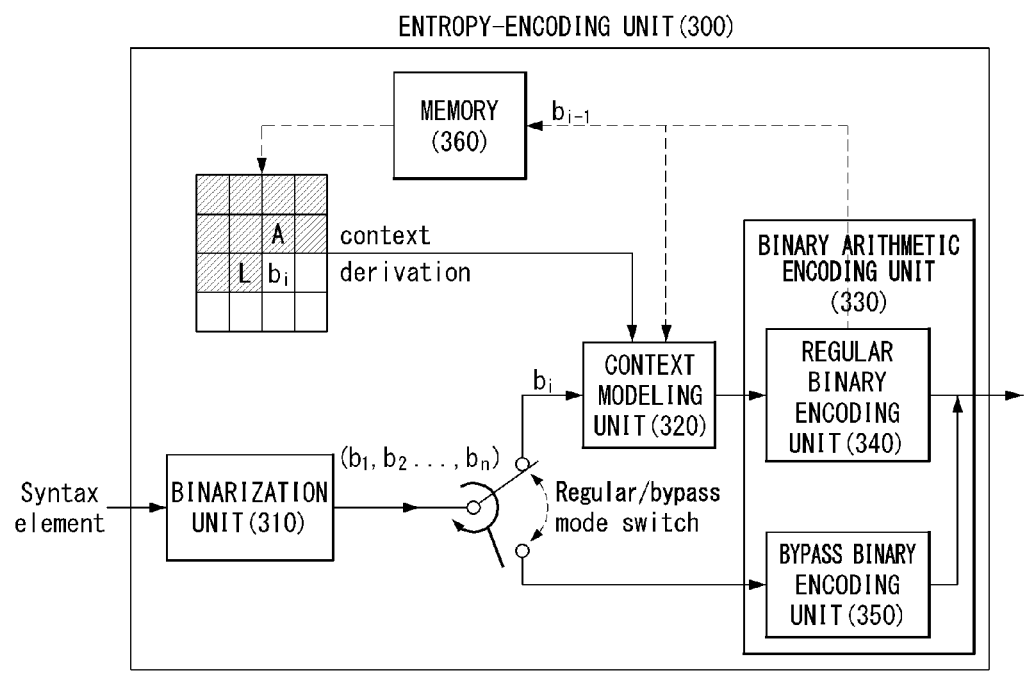

[FIG. 4]
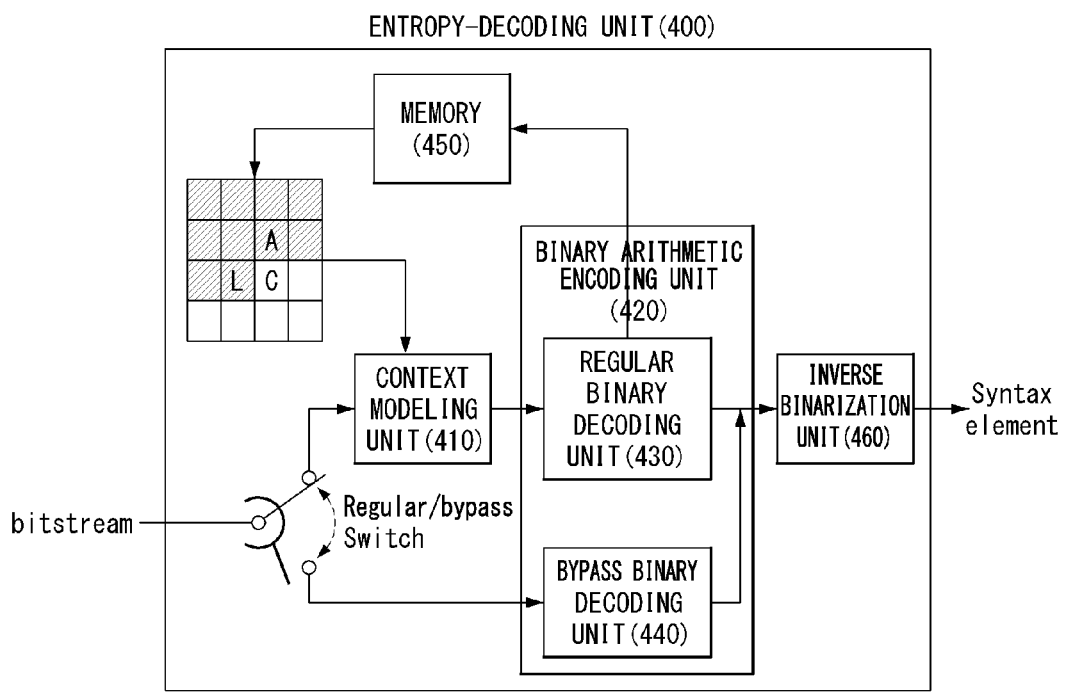

[FIG. 5]
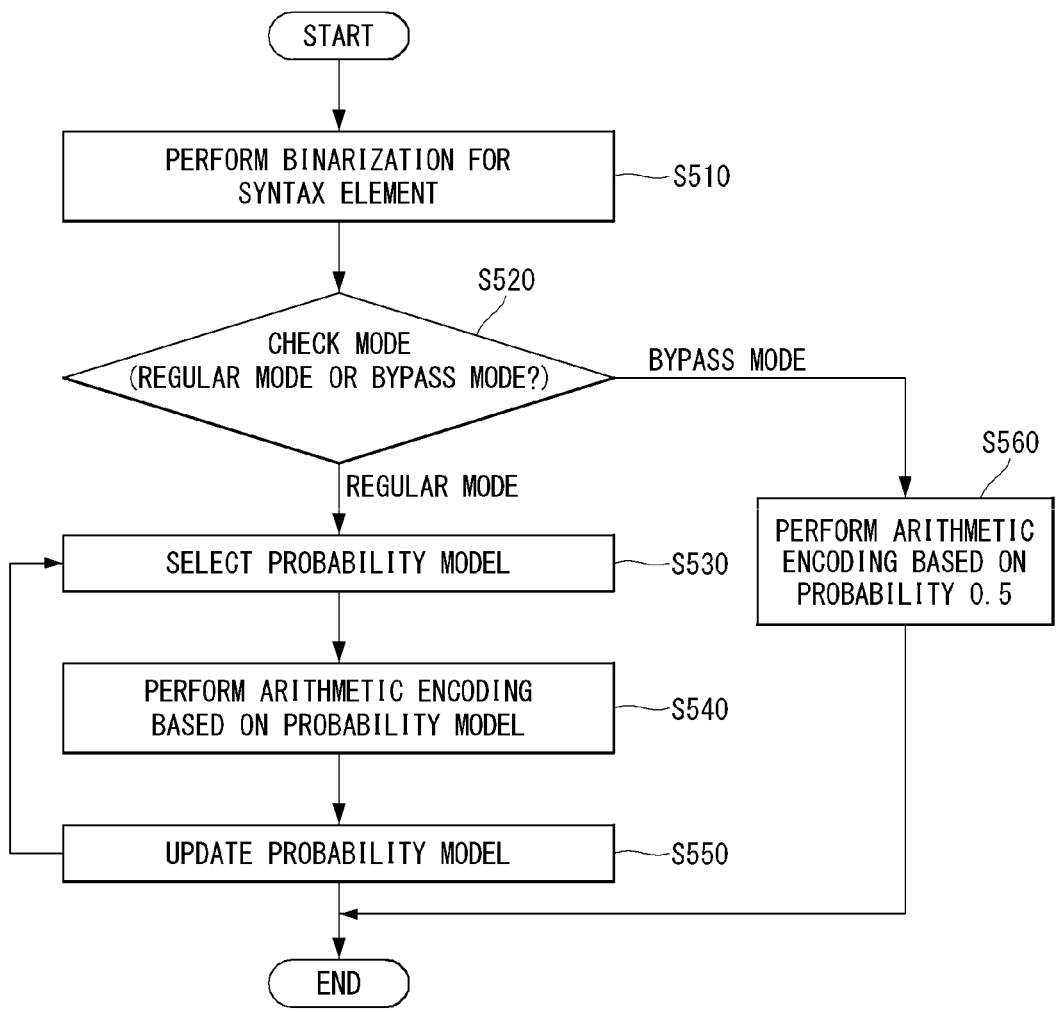

[FIG. 6]
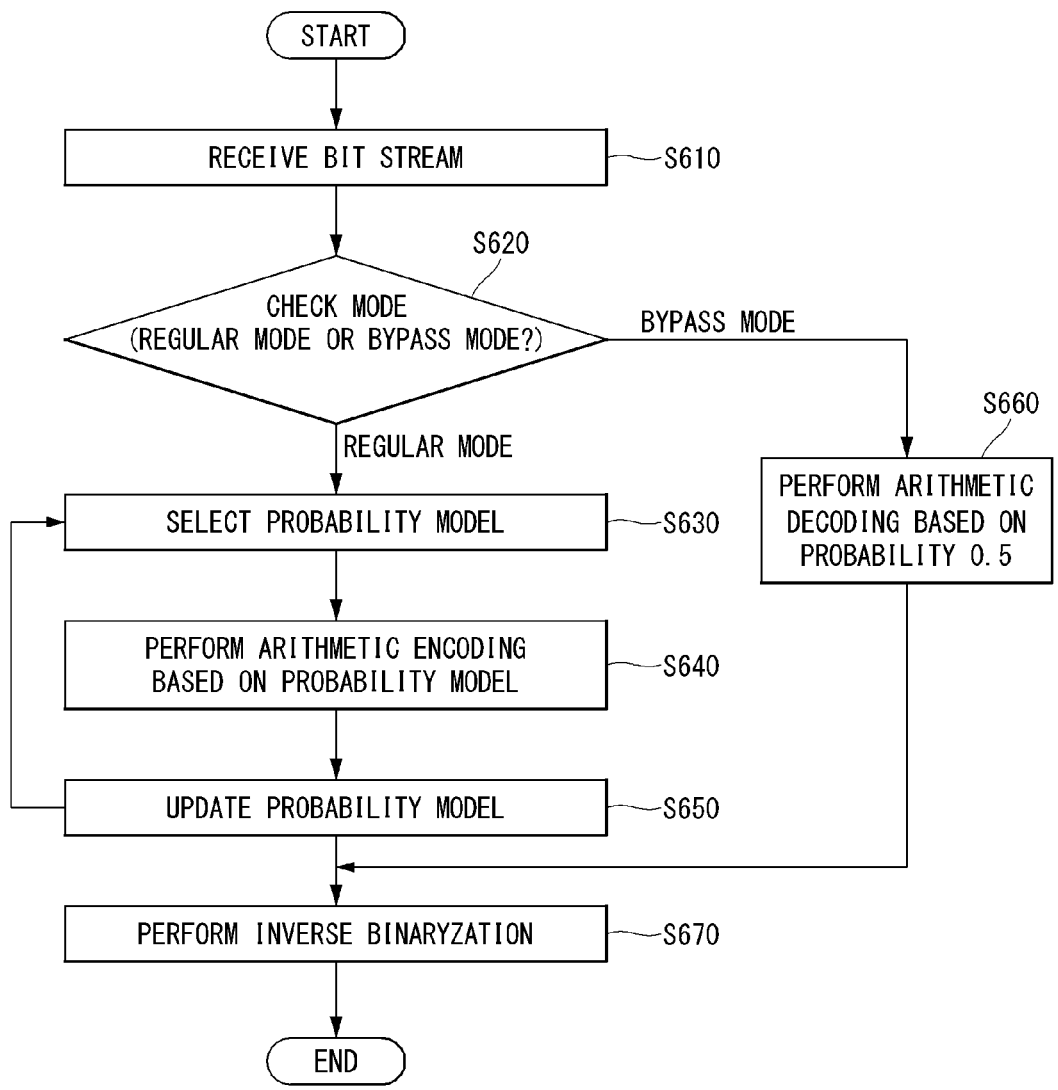

[FIG. 7]
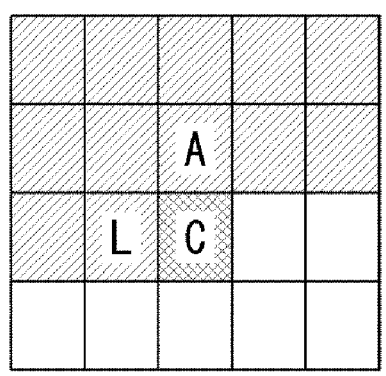

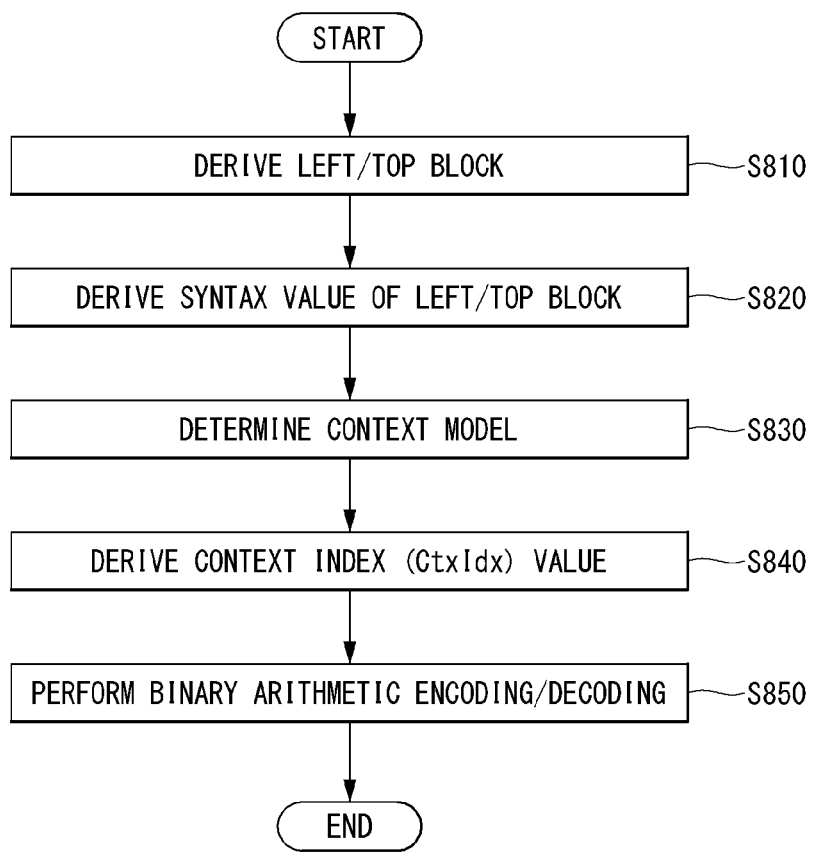
[FIG. 8]

[FIG. 9]
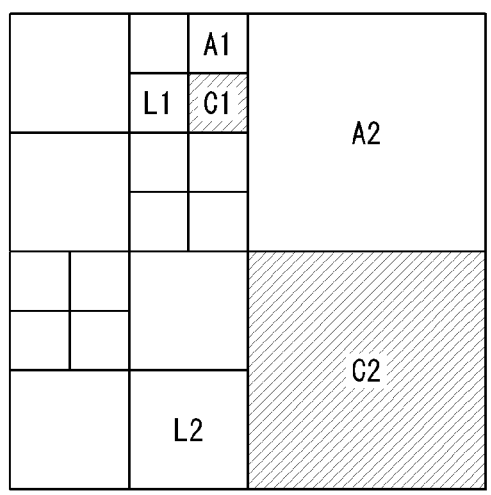

[FIG. 10]

| CtxIdx | BLOCK SIZE | condL | condA |
|---|---|---|---|
| 0 | 256x256 OR 128x128 | 0 | 0 |
| 1 |  | 0 | 1 |
| 1 |  | 1 | 0 |
| 2 |  | 1 | 1 |
| 3 | 64x64 OR 32x32 | 0 | 0 |
| 4 |  | 0 | 1 |
| 4 |  | 1 | 0 |
| 5 |  | 1 | 1 |
| 6 | 16x16 OR 8x8 | 0 | 0 |
| 7 |  | 0 | 1 |
| 7 |  | 1 | 0 |
| 8 |  | 1 | 1 |

[FIG. 11]

|  | slice_segment_header ( ) { | Descriptor |
|---|---|---|
|  | ... |  |
| S1110 | cabac_update_flag | u(1) |
|  | } |  |

【FIG. 12】

|  | slice_segment_header ( ) { | Descriptor |
|---|---|---|
|  | ... |  |
| S1210 | cabac_update_flag | u(1) |
| S1220 | if (cabac_update_flag) |  |
| S1230 | cabac_init_value_diff | se(v) |
|  | } |  |

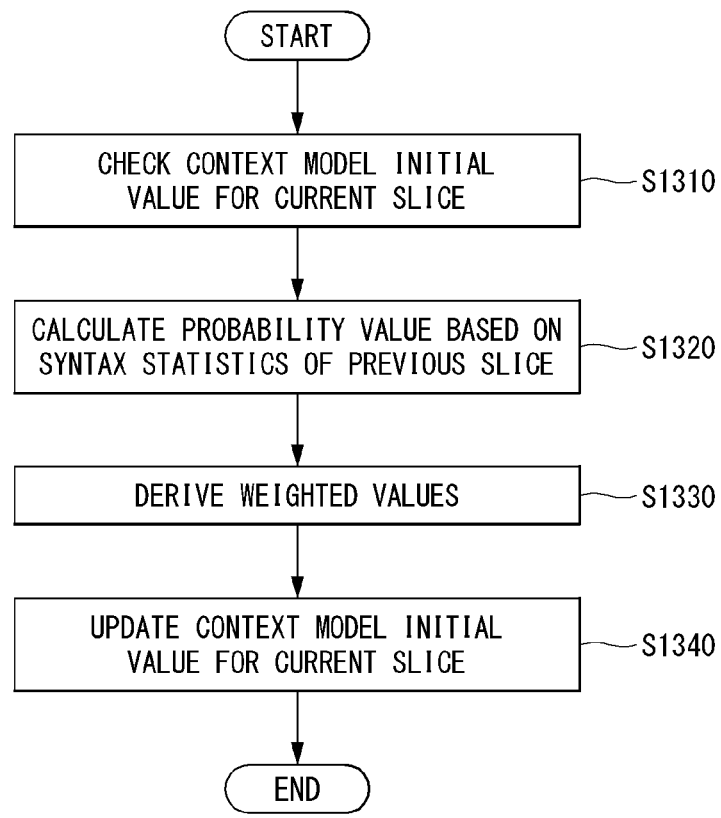
[FIG. 13]

【FIG. 14】

| SYMBOL | BINARYZATION | PROBABILITY | UPDATED BINARYZATION1 | UPDATED BINARYZATION2 |
|---|---|---|---|---|
| 0 | 00 | 40% | 00 | 0 |
| 1 | 01 | 10% | 10 | 110 |
| 2 | 10 | 30% | 01 | 10 |
| 3 | 11 | 20% | 11 | 111 |

[FIG. 15]

| | Bin:15<br>CABAC:13 | Bin:20<br>CABAC:18 | |
|---|---|---|---|
| Bin:50<br>CABAC:45 | Bin:15<br>CABAC:12 | A<br>Bin:20<br>CABAC:23 | Bin:100<br>CABAC:90 |
| Bin:45<br>CABAC:40 | B<br>Bin:20<br>CABAC:15 | Bin:20<br>CABAC:10 | |
| | Bin:20<br>CABAC:15 | Bin:15<br>CABAC:10 | |
| Bin:20<br>CABAC:17 | C<br>Bin:20<br>CABAC:22 | D<br>Bin:50<br>CABAC:55 | Bin:150<br>CABAC:140 |
| Bin:20<br>CABAC:15 | Bin:15<br>CABAC:11 | | |
| Bin:55<br>CABAC:50 | Bin:50<br>CABAC:45 | | |

[FIG. 16]

|  | coding_unit( x0, y0, log2CbSize ) { | Descriptor |
|---|---|---|
| S1610 | bypass_flag | ae(v) |
|  | ... |  |
|  | } |  |

[FIG. 17]

| GROUP | SYNTAX |
|---|---|
| 1 | ENCODING UNIT SYNTAX |
| 2 | GROUP 1 + PREDICTION UNIT SYNTAX |
| 3 | GROUP 2 + PREDICTION INFORMATION SYNTAX |
| 4 | GROUP 3 + TRANSFORM UNIT SYNTAX |
| 5 | GROUP 4 + QUANTIZATION COEFFICIENT SYNTAX |

[FIG. 18]

|  | slice_segment_header ( ) { | Descriptor |
|---|---|---|
| S1810 | bypass_group_idx | ae(v) |
|  | ... |  |
|  | } |  |

[FIG. 19]
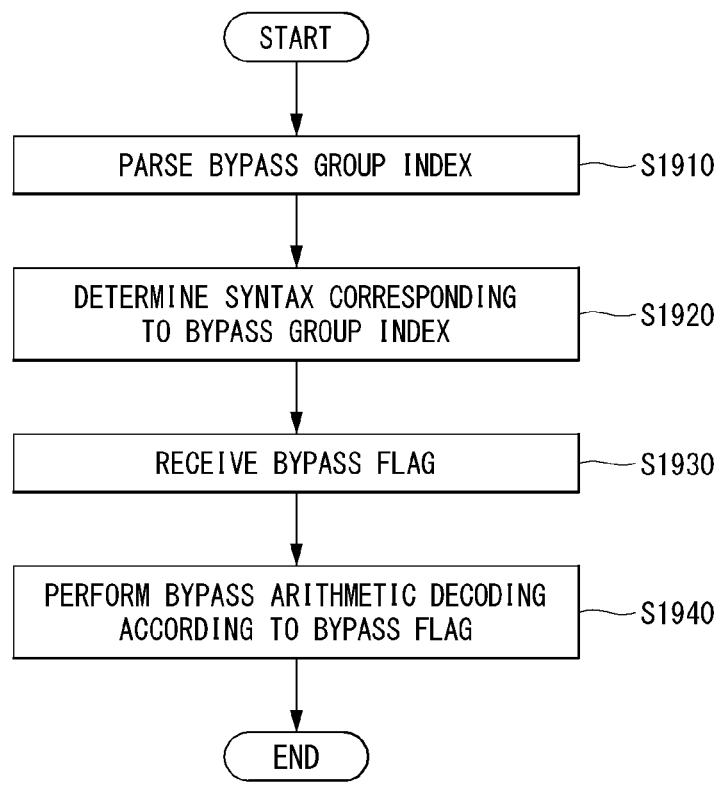

[FIG. 20]
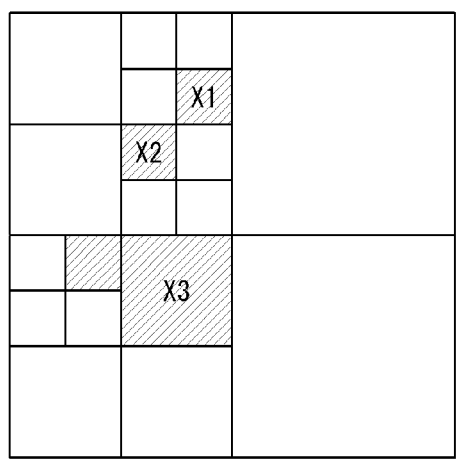
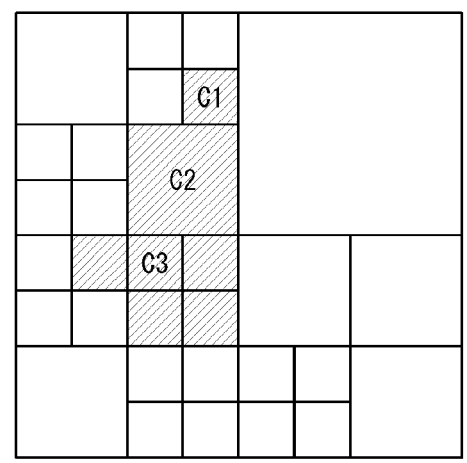
N-1 FRAME        N FRAME

【FIG. 21】

|  | slice_segment_header( ) { | Descriptor |
|---|---|---|
| S2110 | bypass_temporal_pred_flag | ae(v) |
|  | ... |  |
|  | } |  |

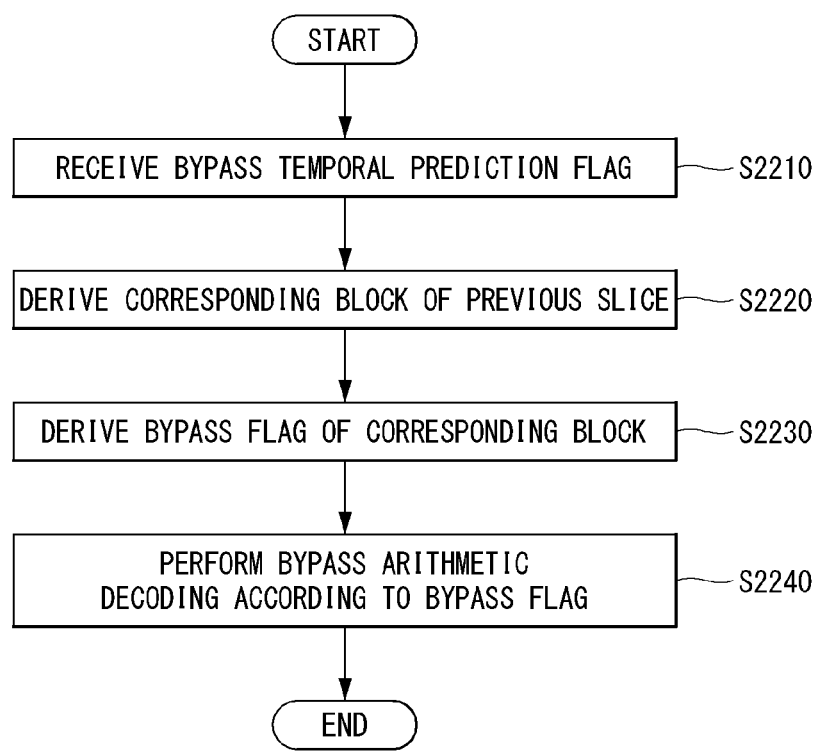
[FIG. 22]

METHOD AND APPARATUS FOR ENTROPY-ENCODING AND ENTROPY-DECODING VIDEO SIGNAL

CROSS-REFERENCE TO RELATED APPLICATIONS

This application is the National Stage filing under 35 U.S.C. 371 of International Application No. PCT/KR2016/013458, filed on Nov. 22, 2016, which claims the benefit of U.S. Provisional Applications No. 62/258,515, filed on Nov. 22, 2015, and No. 62/258,517, filed on Nov. 22, 2015, the contents of which are all hereby incorporated by reference herein in their entirety.

TECHNICAL FIELD

The present invention relates to a method and apparatus for entropy-encoding and entropy-decoding a video signal, more particularly, to a method for selecting a context model adaptively and a method for utilizing a bypass mode adaptively in the case of using Context-based Adaptive Binary Arithmetic Coding (CABAC).

BACKGROUND ART

Entropy coding is a process of non-compressive compressing syntax elements determined through encoding process and generating Raw Byte Sequence Payload (RBSP). The entropy coding uses statistics of syntax and allocates a short bit for the syntax frequently generated and allocates a long bit for other syntax, and then expresses the syntax elements into brief data.

Among these, Context-based Adaptive Binary Arithmetic Coding (CABAC) uses an adaptively updated probability model based on the context of syntax and the symbol previously generated during the process of performing binary arithmetic coding. However, the CABAC has many operations and high complexity, and sequential structure, and accordingly, has a difficulty in parallel operation.

Accordingly, in a video compression technique, it is required to compress and transmit a syntax element more efficiently, and for this, it is required to improve performance of entropy coding.

DISCLOSURE

Technical Problem

The present invention is to propose a method for improving a prediction performance of a context mode when CABAC is performed.

The present invention is to propose a method for utilizing bypass mode-based CABAC for all syntaxes in a block unit.

The present invention is to propose a method for utilizing bypass mode-based CABAC for a specific syntax in a block unit and a grouping method for regulating a specific syntax.

The present invention is to propose a deriving method on whether to apply adaptive bypass mode-based CABAC in a block unit.

The present invention is to propose a method for selecting a context model according to a block size and a syntax value of a neighboring block.

The present invention is to propose a method for updating a probability model based on statistics of syntaxes in a slice unit.

The present invention is to propose a method for updating binarization based on statistics of syntaxes in a slice unit.

Technical Solution

The present invention is to propose a method for selecting a context model based on a neighboring block.

The present invention is to propose a method for selecting a context model based on a block size.

The present invention is to define a flag indicating whether to update a context model based on syntax statistics of a previous slice.

The present invention is to define an initial value of a context model used for updating the context model.

The present invention is to propose a method for updating a context model based on syntax statistics of a previous slice.

The present invention is to define a bypass flag indicating whether it is a bypass mode.

The present invention is to propose a method for classifying syntax for each group in order to apply a bypass mode adaptively.

The present invention is to define a bypass group index in order to apply a bypass mode adaptively.

The present invention is to propose a method for performing bypass mode arithmetic decoding based on a bypass group index.

The present invention is to propose a method for deriving a bypass mode of a current block.

The present invention is to define a bypass temporal prediction flag indicating whether to predict a bypass flag from a previous frame.

The present invention is to propose a method for performing bypass mode arithmetic decoding based on a bypass temporal prediction flag.

Technical Effects

The present invention may improve a performance of entropy-encoding by utilizing a block size and a syntax value or updating a context model based on statistics of a previous slice in order to improve prediction performance of a context model when performing CABAC.

The present invention may improve a performance of entropy-encoding by performing entropy-encoding of all syntaxes of a current block in a block unit when performing CABAC by utilizing a bypass mode.

DESCRIPTION OF DRAWINGS

FIG. 1 is a block diagram illustrating a configuration of an encoder for encoding a video signal according to an embodiment of the present invention.

FIG. 2 is a block diagram illustrating a configuration of a decoder for decoding a video signal according to an embodiment of the present invention.

FIG. 3 illustrates a schematic block diagram of an entropy-encoding unit to which Context-based Adaptive Binary Arithmetic Coding (CABAC) is applied, as an embodiment to which the present invention is applied.

FIG. 4 illustrates a schematic block diagram of an entropy-decoding unit to which Context-based Adaptive Binary Arithmetic Coding (CABAC) is applied, as an embodiment to which the present invention is applied.

FIG. 5 illustrates an encoding flowchart performed according to Context-based Adaptive Binary Arithmetic Coding (CABAC), as an embodiment to which the present invention is applied.

FIG. 6 illustrates a decoding flowchart performed according to Context-based Adaptive Binary Arithmetic Coding (CABAC), as an embodiment to which the present invention is applied.

FIG. 7 illustrates a block relation diagram for describing a method for selecting a context model based on a neighboring block, as an embodiment to which the present invention is applied.

FIG. 8 is a flowchart illustrating a method of selecting a context model using a left block and a top block, as an embodiment to which the present invention is applied.

FIG. 9 illustrates a block relation diagram for describing a method for selecting a context model based on a block size, as an embodiment to which the present invention is applied.

FIG. 10 illustrates index values of a context model according to a block size and a syntax value of a neighboring block, as an embodiment to which the present invention is applied.

FIG. 11 is syntax for a flag indicating whether an update is performed based on syntax statistics of a previous slice, as an embodiment to which the present invention is applied.

FIG. 12 is syntax for a context model initial value used for updating a context model, as an embodiment to which the present invention is applied.

FIG. 13 is a flowchart illustrating a method for updating a context model based on syntax statistics of a previous slice, as an embodiment to which the present invention is applied.

FIG. 14 illustrates a table for describing a binary update method based on statistics, as an embodiment to which the present invention is applied.

FIG. 15 is a block relation diagram for describing binarization bin number and CABAC bin number for each block, as an embodiment to which the present invention is applied.

FIG. 16 is syntax defining a bypass flag indicating whether it is in a bypass mode, as an embodiment to which the present invention is applied.

FIG. 17 illustrates a Table for describing a method for classifying syntaxes for each group for applying bypass mode adaptively.

FIG. 18 is syntax defining a bypass group index for adaptively applying a bypass mode, as an embodiment to which the present invention is applied.

FIG. 19 is a flowchart describing a process of performing bypass mode arithmetic decoding based on a bypass group index, as an embodiment to which the present invention is applied.

FIG. 20 is a block relation diagram for describing a method for deriving a bypass mode of a current block, as an embodiment to which the present invention is applied.

FIG. 21 is syntax for a bypass temporal prediction flag indicating whether a bypass flag is predicted from a previous frame, as an embodiment to which the present invention is applied.

FIG. 22 is a flowchart describing a process of performing bypass mode arithmetic decoding based on a bypass temporal prediction flag, as an embodiment to which the present invention is applied.

BEST MODE FOR INVENTION

The present invention provides a method of performing an entropy decoding for a video signal including obtaining a context model initial value for a current slice; calculating a probability value based on syntax statistics of a previous slice; deriving weighted values corresponding to the context model initial value for the current slice and the syntax statistics of the previous slice; and updating the context model initial value for the current slice using the weighted values.

In the present invention, the method further includes obtaining, from the video signal, an update flag indicating whether to perform update for a context model, and the context model initial value for the current slice is obtained when the update is performed for a context model based on the update flag.

In the present invention, the method further includes obtaining a difference value between the context model initial value for the current slice and a context model initial value for the previous slice, and the context model initial value for the current slice is obtained based on the difference value.

In the present invention, the difference value is obtained for each syntax element.

In the present invention, the method further includes deriving a context model for syntax element from a neighboring block; and performing an entropy decoding using the context model, and the context model is derived using at least one of a block size or a block split depth.

In the present invention, the context model is derived based on a comparison result of a size of the neighboring block and a size of a current block.

In the present invention, the context model is determined based on a syntax element value of the neighboring block for each split depth of a current block.

The present invention provides a method for performing an entropy decoding for a video signal including obtaining a bypass group index from the video signal, wherein the bypass group index is an index indicating a group of specific syntaxes to which a bypass mode is applied; checking syntax elements corresponding to the bypass group index; obtaining a bypass flag indicating whether to apply the bypass mode for the syntax elements; and when the bypass mode is applied to a specific syntax according to the bypass flag, performing a bypass binary arithmetic decoding for the specific syntax.

In the present invention, the bypass group index is obtained in a slice unit, and the bypass flag is obtained in a block unit.

In the present invention, the bypass group index corresponds to at least one group combinable from coding unit syntax, prediction unit syntax, prediction information syntax, transform unit syntax and quantization coefficient syntax.

In the present invention, the bypass flag is derived from a corresponding block of a previous slice or a previous frame.

In the present invention, the corresponding block is a block located in a same position as a current block or a block located in a position indicated by a motion vector of the current block.

In the present invention, the method further includes obtaining a bypass temporal prediction flag from the video signal, and the bypass temporal prediction flag indicates whether to derive a bypass flag from a previous frame or a previous slice.

The present invention provides an apparatus for performing an entropy decoding for a video signal including a memory for storing a probability value based on syntax statistics of a previous slice; and a context modeling unit for obtaining a context model initial value for a current slice, calculating a probability value based on syntax statistics of a previous slice, deriving weighted values corresponding to the context model initial value for the current slice and the syntax statistics of the previous slice, and updating the context model initial value for the current slice using the weighted values.

In the present invention, the context modeling unit obtains, from the video signal, an update flag indicating whether to perform update for a context model, and the context model initial value for the current slice is obtained when the update is performed for a context model based on the update flag.

The present invention provides an apparatus for performing an entropy decoding for a video signal including a parsing unit for parsing a bypass group index from the video signal; and a binary arithmetic decoding unit for checking syntax elements corresponding to the bypass group index, obtaining a bypass flag indicating whether to apply a bypass mode for the syntax elements, and when the bypass mode is applied to a specific syntax according to the bypass flag, performing a bypass binary arithmetic decoding for the specific syntax, and the bypass group index is an index indicating a group of specific syntaxes to which the bypass mode is applied.

MODE FOR INVENTION

Hereinafter, exemplary elements and operations in accordance with embodiments of the present invention are described with reference to the accompanying drawings. It is however to be noted that the elements and operations of the present invention described with reference to the drawings are provided as only embodiments and the technical spirit and kernel configuration and operation of the present invention are not limited thereto.

In addition, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in the present disclosure are common terms selected to describe the invention, but may be replaced with other terms for more appropriate analysis if such terms having similar meanings are present. For example, a signal, data, a sample, a picture, a frame, and a block may be properly replaced and interpreted in each coding process.

In addition, the concepts and the methods described in the present disclosure may be applied to other embodiments, and the combination of the embodiments is also applicable within the inventive concept of the present invention although it is not explicitly described in the present disclosure.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, a de-quantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. For example, the transform technique may include at least one of Discrete Cosine Transform (DCT), Discrete Sine Transform (DST), Karhunen-Loève Transform (KLT), Graph-Based Transform (GBT), or Conditionally Non-linear Transform (CNT). When GBT represents the relation information between pixels as a graph, the GBT means a transform obtained from the graph. CNT means a transform by generating a prediction signal by using all previously reconstructed pixel and obtained based on it. In addition, the transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as bitstreams.

The quantized signal output from the quantization unit 130 may be used to generate a prediction signal. For example, the quantized signal may be subjected to a de-quantization and an inverse transform via the de-quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction. In this case, in order to reduce the amount of motion information transmitted from the inter-prediction mode, the motion information may be predicted based on correlation of motion information between a neighboring block and a current block.

The intra-prediction unit 185 may predict a current block by referring to samples in the vicinity of a block to be encoded currently. The intra-prediction unit 185 may perform a following procedure to perform intra prediction. First, the intra-prediction unit 185 may prepare reference samples needed to generate a prediction signal. Then, the intra-prediction unit 185 may generate the prediction signal using the prepared reference samples. Thereafter, the intra-prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction.

The prediction signal generated via the inter-prediction unit 180 or the intra-prediction unit 185 may be used to generate the reconstructed signal or used to generate the residual signal.

FIG. 2 shows a schematic block diagram of a decoder for decoding a video signal, in accordance with one embodiment of the present invention.

Referring to FIG. 2, a decoder 200 may include an entropy-decoding unit 210, a de-quantization unit 220, an inverse transform unit 230, a filtering unit 240, a decoded picture buffer (DPB) 250, an inter-prediction unit 260 and an intra-prediction unit 265.

A reconstructed video signal output from the decoder 200 may be reproduced using a reproducing device.

The decoder 200 may receive the signal output from the encoder as shown in FIG. 1. The received signal may be entropy-decoded via the entropy-decoding unit 210.

The de-quantization unit 220 may obtain a transform coefficient from the entropy-decoded signal using quantization step size information.

The inverse transform unit 230 may inverse-transform the transform coefficient to obtain a residual signal.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter-prediction unit 260.

Herein, detailed descriptions for the filtering unit 160, the inter-prediction unit 180 and the intra-prediction unit 185 of the encoder 100 may be equally applied to the filtering unit 240, the inter-prediction unit 260 and the intra-prediction unit 265 of the decoder 200 respectively.

FIG. 3 illustrates a schematic block diagram of an entropy-encoding unit to which Context-based Adaptive Binary Arithmetic Coding (CABAC) is applied, as an embodiment to which the present invention is applied.

An entropy-encoding unit 300, to which the present invention is applied, includes a binarization unit 310, a context modeling unit 320, a binary arithmetic encoding unit 330 and a memory 360, and the binary arithmetic encoding unit 330 includes a regular binary encoding unit 340 and a bypass binary encoding unit 350. Here, the regular binary encoding unit 340 and the bypass binary encoding unit 350 may be called as a regular coding engine and a bypass coding engine, respectively.

The binarization unit 310 may receive a sequence of data symbols and perform binarization thereon to output a binary symbol (bin) string including a binarized value of 0 or 1. The binarization unit 310 may map syntax elements to binary symbols. Various different binarization processes, e.g., unary (U), truncated unary (TU), k-order Exp-Golomb (EGk), and fixed length processes, and the like, may be used for binarization. The binarization process may be selected on the basis of a type of a syntax element.

The output binary symbol string is transmitted to the context modeling unit 320.

The context modeling unit 320 selects probability information required for coding a current block from the memory, and transmits it to the binary arithmetic encoding unit 330. For example, the context modeling unit 320 may select a context memory based on a syntax element to code, and may select probability information required for coding a current syntax element through a bin index (binIdx). Here, the context means information of a generation probability of a symbol, and the context modeling means a process of estimating a probability of bin required for binary arithmetic coding with bin, which is a result of the binarization, as an input.

The context modeling unit 320 may provide accurate probability estimation required for obtaining high coding efficiency. Thus, different context models may be used for different binary symbols, and a probability of the context models may be updated on the basis of values of previously coded binary symbols. In this case, the values of previously coded binary symbols may be stored in the memory 360, and the context modeling unit 320 may use the values of previously coded binary symbols from it.

Binary symbols having a similar distribution may share the same context model. A context model regarding each binary symbol may use at least one of syntax information of bin, a bin index indicating a position of bin in a bin string and probability of bin included in a neighboring block of a block including bin.

The binary arithmetic encoding unit 330 includes a regular binary encoding unit 340 and a bypass binary encoding unit 350, and performs entropy-encoding on the output string and outputs compressed data bits.

The regular binary encoding unit 340 performs an arithmetic coding based on recursive interval division.

First, an interval (or a range), with an initial value of 0 to 1, is divided into two subintervals based on the probability of the bin. The encoded bits provide an offset that, when converted to a binary fraction, selects one of the two subintervals, which indicates the value of the decoded bin.

After every decoded bin, the interval may be updated to equal the selected subinterval, and the interval division process repeats itself. The interval and offset have limited bit precision, so renormalization may be required whenever the interval falls below a specific value to prevent underflow. The renormalization may occur after each bin is decoded.

The bypass binary encoding unit 350 performs encoding without a context mode, and performs coding by fixing probability of a currently coded bin to 0.5. This may be used when it is difficult to determine a probability of syntax or it is designed to code with high speed.

FIG. 4 illustrates a schematic block diagram of an entropy-decoding unit to which Context-based Adaptive Binary Arithmetic Coding (CABAC) is applied, as an embodiment to which the present invention is applied.

An entropy-decoding unit 400 includes a context modeling unit 410, a binary arithmetic decoding unit 420, a memory 450 and an inverse binarization unit 460, and the binary arithmetic decoding unit 420 includes a regular binary decoding unit 430 and a bypass binary decoding unit 440.

The entropy-decoding unit 400 may receive a bit stream and may identify a bypass flag from it. Here, the bypass flag indicates whether it is a bypass mode, and the bypass mode means that coding is performed by fixing a probability of bin which is currently coded to 0.5, not using a context model.

In the case of not the bypass mode according to the bypass flag, the regular binary decoding unit 430 performs a binary arithmetic decoding according to a regular mode.

At this time, the context modeling unit 410 selects probability information required for decoding a current bit stream from the memory 450, and transmits it to the regular binary decoding unit 430.

Meanwhile, in the case of the bypass mode according to the bypass flag, the bypass binary decoding unit 440 performs a binary arithmetic decoding according to the bypass mode.

The inverse binarization unit 460 receives bin in a binary number form decoded from the binary arithmetic decoding unit 420, and transforms and outputs it into a syntax element value in an integer form.

FIG. 5 illustrates an encoding flowchart performed according to Context-based Adaptive Binary Arithmetic Coding (CABAC), as an embodiment to which the present invention is applied.

An encoder may perform a binarization for a syntax element (step, S510).

The encoder may check whether to perform a binary arithmetic coding according to the regular mode or perform a binary arithmetic coding according to the bypass mode (step, S520). For example, the encoder may check whether it is in the regular mode or the bypass mode based on a bypass flag, and for example, when the bypass flag is 1, this may indicate the bypass mode, and when the bypass flag is 0, this may indicate the regular mode.

When it is in the regular mode, the encoder may select a probability model (step, S530), and may perform a binary arithmetic decoding based on the probability model (step, S540). Further, the encoder may update the probability model (step, S550), and may select a proper probability model again based on the updated probability model which is updated in step S530.

Meanwhile, when it is in the bypass mode, the encoder may perform a binary arithmetic decoding based on probability 0.5 (step, S560).

FIG. 6 illustrates a decoding flowchart performed according to Context-based Adaptive Binary Arithmetic Coding (CABAC), as an embodiment to which the present invention is applied.

First, a decoder may receive a bit stream (step, S610).

The decoder may extract a bypass flag from the bit stream, and check whether it is in the regular mode or the bypass mode (step, S620). Here, the bypass flag may be predetermined according to a type of syntax.

In the case that the bypass flag indicates the regular mode, the decoder may select a probability model (step, S630), and may perform a binary arithmetic decoding based on the probability model (step, S640). Further, the decoder may update the probability model (step, S650), and may select a proper probability model again based on the updated probability model which is updated in step S630.

Meanwhile, when the bypass flag indicates the bypass mode, the decoder may perform a binary arithmetic decoding based on probability 0.5 (step, S660).

The decoder may perform an inverse binarization for the decoded bin string (step, S670). For example, the decoder may receive bin in a binary number form, and may transform and output it into a syntax element value in an integer form.

FIG. 7 illustrates a block relation diagram for describing a method for selecting a context model based on a neighboring block, as an embodiment to which the present invention is applied.

Referring to FIG. 7, a current block is referred to as C, a left block adjacent to the current block is referred to as L, and a top block is referred to as A. A context model for syntax of the current block C may be determined by using at least one of the left block L or the top block A, which is a neighboring block. Equation 1 below represents a method of selecting a context model based on the left block and the top block.

$$\text{CtxIdx}=(\text{cond}L\&\&\text{available}L)+(\text{cond}A\&\&\text{available}A) \quad \text{[Equation 1]}$$

Herein, availableL and availableA represent whether a left block and a top block are existed, respectively, and condL and condA mean respective syntax values for the left block and the top block.

According to Equation 1 above, three context models may be used according to the syntax value of the neighboring block. The context model may be determined depending on the syntax value of the neighboring block, without regard to the size of the current block and the size of the neighboring block. However, depending on the size of a block which is encoded, statistical property of the syntax element may be changed, generally. Accordingly, the present invention proposes a new method for selecting a context model based on a block size and a statistical property.

FIG. 8 is a flowchart illustrating a method of selecting a context model using a left block and a top block, as an embodiment to which the present invention is applied.

According to the present invention, the method of selecting a context model may applied to both of an encoder and a decoder, and it will be described based on a decoder for the convenience of description.

First, a decoder may derive a left block and a top block which are neighboring a current block (step, S810). That is, the decoder may check whether the left block and the top block which are neighboring the current block are usable.

In the case that at least one of the left block and the top block are usable, the decoder may derive a syntax value from at least one of the left block and the top block (step, S820).

In addition, the decoder may determine a context model based on a syntax value of at least one of the left block and the top block (step, S830).

Based on the context model which is determined, the decoder may derive a context index (CtxIdx) value (step, S840).

The decoder may perform a binary arithmetic decoding based on the context index (CtxIdx) value (step, S850).

FIG. 9 illustrates a block relation diagram for describing a method for selecting a context model based on a block size, as an embodiment to which the present invention is applied.

According to the present invention, the method of selecting a context model may applied to both of an encoder and a decoder, and it will be described based on a decoder for the convenience of description.

As an embodiment of the present invention, a decoder may select a context model based on at least one of a block size and a syntax value of a neighboring block. For example, referring to FIG. 9, with respect to C1 block, a context model may be selected by using syntax values of L1 and A1 that are adjacent blocks to left and top sides, respectively. With respect to C2 block, a context model may be selected by using syntax values of L2 and A2 that are adjacent blocks to left and top sides, respectively. In the case that an adjacent block is split like L2, at least one of the split blocks may used, and FIG. 9 shows the case that L2 is used.

Since sizes of C1 block and C2 block are different, the syntax properties may be different. Accordingly, by considering the block size and the syntax value of the neighboring block together, a context model may be selected.

Equation 2 below represents a method of selecting a context model by using a left block and a top block, and a quad tree depth.

$$CtxIdx=(QTDepth\gg1)*3+(condL\&\&availableL)+(condA\&\&availableA) \quad \text{[Equation 2]}$$

Herein, QTDepth means a value of a quad tree depth of a current block. For example, in the case that a CU size is allowed from 8×8 to 256×256, the QTDepth value may have a value of 0 to 5. Further, availableL and availableA represent whether a left block and a top block are existed, respectively, and condL and condA mean the syntax values for the left block and the top block, respectively. According to Equation 2 above, nine context models may be used according to the syntax value of the neighboring block.

Detailed embodiments for this will be described in more detail with reference to FIG. 10.

FIG. 10 illustrates index values of a context model according to a block size and a syntax value of a neighboring block, as an embodiment to which the present invention is applied.

Referring to FIG. 10, in the case that a block size is allowed from 8×8 to 256×256, it is identified that CtxIdx value is differently determined depending on a block size and a syntax value of a neighboring block.

For example, in the case that a block size is 256×256 or 128×128, CtxIdx value may have values of 0, 1 and 2, and CtxIdx value may be determined according to a summation of syntax values of neighboring blocks. In the case that all of syntax values of a left block and a top block are 0, CtxIdx value is 0, and in the case that either one of syntax value of a left block or a top block is 1, CtxIdx value is 1. In the case that all of syntax values of a left block and a top block are 1, CtxIdx value is 2.

Similarly, in the case that a block size is 64×64 or 32×32, CtxIdx value may have values of 3, 4 and 5, and CtxIdx value may be determined according to a syntax value of a neighboring block.

In addition, in the case that a block size is 16×16 or 8×8, CtxIdx value may have values of 6, 7 and 8, and CtxIdx value may be determined according to a syntax value of a neighboring block.

FIG. 11 is syntax for a flag indicating whether an update is performed based on syntax statistics of a previous slice, as an embodiment to which the present invention is applied.

According to the present invention, a context model may be updated based on statistics of a corresponding syntax or a binarization method may be changed in a slice unit.

Referring to FIG. 11, syntax is illustrated for a flag indicating whether an update is performed for a context model. For example, cabac_update_flag (S1110) is a flag indicating whether an update is applied based on statistics of syntax of a previous slice. When cabac_update_flag value is 1, an update is performed for the context model, and when cabac_update_flag value is 0, an update is not performed for the context model.

Further, it may be designated in a slice header on whether to perform updates for all syntaxes like cabac_update_flag, but the present invention is not limited thereto. For example, it may also be defined in other level (a sequence parameter set, a picture parameter set, a coding tree set, a coding unit, a transform unit, etc.), or it may be determined whether to perform an update for a context model for each of syntaxes.

Hereinafter, a method for performing an update for a context model will be described.

FIG. 12 is syntax for a context model initial value used for updating a context model, as an embodiment to which the present invention is applied.

As an embodiment of a method for updating a context model, an update may be performed by directly transmitting an initial value of a context model.

Referring to FIG. 12, a decoder may obtain a flag indicating whether to perform an update for a context model (step, S1210). For example, as described in FIG. 11, the decoder may check whether to perform an update for a context model by obtaining cabac_update_flag.

When cabac_update_flag is 1 as a result of the checking (step, S1220), a context model initial value may be obtained for performing an update for a context model (step, S1230). For example, the syntax indicating the context model initial value may be represented as cabac_init_value_diff. Here, the context model initial value may be defined as a difference value between the context model initial value of a current slice and the context model initial value of a previous slice.

As another embodiment, the context model initial value for performing an update for a context model may be transmitted for each of the syntaxes.

FIG. 13 is a flowchart illustrating a method for updating a context model based on syntax statistics of a previous slice, as an embodiment to which the present invention is applied.

As an embodiment of updating a context model, a decoder may update a context model by accumulating statistical properties for syntax in a previous slice. That is, by using a summation of weighted values for a probability value based on statistics obtained from a previous slice and an initial value of a context model in a current slice, an initial value of a new context model may be determined.

First, a decoder may obtain a context model initial value for a current slice (step, S1310). Here, the corresponding context model initial value may be directly transmitted, but the present invention is not limited thereto. For example, a difference value between a context model initial value for the previous slice and a context model initial value for the current slice is transmitted, and the context model initial value for the current slice may be derived.

The decoder may calculate a probability value based on syntax statistics of the previous slice (step, S1320).

The decoder may derive weighed values corresponding to the context model initial value for the current slice and the syntax statistics of the previous slice (step, S1330).

Further, the decoder may apply the weighed values corresponding to the context model initial value for the current slice and the syntax statistics of the previous slice, and may update the context model initial value for the current slice (step, S1340).

Equation 3 below represents a method for updating a context model based on statistical property for syntax in a previous slice.

$$Ctx_{slice(i)}=w1\times Ctx_{init}+w2\times Ctx_{slice(i-1)} \quad \text{[Equation 3]}$$

Here, $Ctx_{init}$ represents an initial value of a context model defined in the current slice, and $Ctx_{slice(i-1)}$ represents a statistics value obtained from statistics of the syntax which is actually occurred in the previous slice. w1 and w2 represent weighted values for updating the context model initial value for the current slice.

FIG. 14 illustrates a table for describing a binary update method based on statistics, as an embodiment to which the present invention is applied.

According to the present invention, an initial statistics value of a context value may be directly updated, or binarization mapping may be modified corresponding to statistical distribution. That is, a binarization method may be adaptively modified according to the statistical distribution of syntax generated in a previous slice.

FIG. 14 shows binary update method based on statistics.

When there are four symbol values, a binarization may be available in two bits. At this time, when the first bit of the binarization uses a probability model of which generation probability of 0 is high, the binarization code "00" and "01" should be allocated to symbols that are frequently generated. However, since the generation probability symbol 2 is higher than that of symbol 1 in FIG. 14, it may be efficient to perform binarization of symbol 2 to "01" as shown in FIG. 14(a).

As another embodiment of the present invention, binarization may be performed for symbol 0 having the highest probability into 1 bit and binarization may be performed in a truncated unary form according to statistical distribution for the remaining symbols.

FIG. 15 is a block relation diagram for describing binarization bin number and CABAC bin number for each block, as an embodiment to which the present invention is applied.

As an embodiment of the present invention, bypass mode may be encoded for all syntaxes in a block for each block.

FIG. 15 shows the binarization bin number and the CABAC bin number for each block. In most of all blocks, entropy encoding is efficient since the bin number generated in CABAC is smaller than the bin number generated in binarization. However, in specific blocks (e.g., A, B, C and D blocks), entropy encoding is inefficient since the bin number generated in CABAC is greater than the bin number generated in binarization.

In such a case, when the bypass mode is used instead of the regular mode, the maximum bin number may be limited to the binarization bin number. For example, for block D in FIG. 15, the binarization bin number is 50 bits, but 55 bits are generated by the CABAC, and accordingly, entropy-encoding is inefficient. When the bypass mode is used for all syntax in a block for the block, 50 bits are generated, and accordingly, 5 bits may be saved.

Likewise, in the cases of A, B and C blocks, since the bin number generated by the CABAC is greater than the bin number by the binarization, when the bypass mode is used for the blocks, 20 bits are generated, and thus, 3 bits, 5 bits and 2 bits may be saved, respectively.

FIG. 16 is syntax defining a bypass flag indicating whether it is in a bypass mode, as an embodiment to which the present invention is applied.

FIG. 16 shows the syntax for applying the bypass mode adaptively in a block unit which is proposed. According to the present invention, a flag may be transmitted in a coding unit level or in the largest encoding block unit (e.g., coding tree unit). In FIG. 16, a bypass flag is transmitted in a coding unit level, and decoded in the first front part of the block syntax.

In the case that a bypass flag value is 1, all syntaxes in a block are decoded in the bypass mode, and in the case that a bypass flag value is 0, the syntax in a block are decoded by the regular mode determined for each syntax or by the bypass mode.

In addition, even in the case that a single block is decoded by using the bypass mode, the probability model for each of the syntaxes may or may not perform update according to the corresponding value.

FIG. 17 illustrates a Table for describing a method for classifying syntaxes for each group for applying bypass mode adaptively.

As an embodiment of the present invention, a specific syntax in a block may be encoded in the bypass mode for each block. This is because the case of setting all syntaxes in a block to the bypass mode is not more efficient than the case of setting all syntaxes in a block to the regular mode.

Accordingly, the present invention proposes a method for using the bypass mode adaptively.

As the first example, in the case of not including a quantized coefficient, the bypass mode may be used.

As the second example, specific syntaxes may be grouped and the regular mode or the bypass mode may be applied for each group.

FIG. 17 shows an embodiment in which syntaxes are classified for each group.

For example, group 1 may include encoding unit syntax. As a particular example, the encoding unit syntax may include at least one syntax of split_cu_flag, cu_transquant_bypass_flag, cu_skip_flag, pred_mode_flag, or part_mode. Here, split_cu_flag is a flag indicating whether a coding unit is split into coding units of half horizontal and vertical size. The cu_transquant_bypass_flag is a flag indicating whether scaling, transform and in-loop filtering processes are bypassed or not. The cu_skip_flag is a flag indicating whether a coding unit is skipped. The pred_mode_flag is a flag indicating whether a current coding unit is coded in an inter-prediction mode or an intra-prediction mode. The part_mode indicates a partitioning mode of the current coding unit.

Group 2 may include prediction unit syntax in addition to group 1 additionally. As a particular example, the prediction unit syntax may include at least one syntax of merge_flag or merge_idx. Here, merge_flag is a flag indicating whether inter-prediction parameters for a current prediction unit are predicted from a neighboring inter-prediction partition, and merge_idx indicates a merge candidate index of a merge candidate list.

Group 3 may include prediction information syntax in addition to group 2 additionally. As a particular example, the prediction information syntax may include at least one syntax of a prediction mode within an image, a motion vector prediction index, a prediction direction index between images, a reference image index and a motion vector residual value.

Group 4 may include transform unit syntax in addition to group 3 additionally. As a particular example, the transform unit syntax may include at least one syntax of split_transform_flag, cbf or delta_qp. Here, the split_transform_flag is a flag indicating whether a block is partitioned into blocks of half horizontal and vertical size for transform coding. The cbf is a flag indicating whether a transform block includes a non-zero transform coefficient level of 1 or more. The delta_qp indicates a difference value between a quantization parameter of a current coding unit and the prediction value.

Group 5 may include quantization coefficient syntaxes in addition to group 4 additionally. As a particular example, the quantization coefficient syntax may include at least one of transform_skip_flag, last_sig_coeff, sig_coeff_flag or coeff_abs_level, in relation to encoding of the quantization coefficient. Here, transform_skip_flag is a flag indicating whether a transform is applied to a related transform block. The last_sig_coeff indicates position information of the last coefficient according to a scanning order in a transform block. The sig_coeff_flag is a flag indicating whether a transform coefficient level is non-zero in a transform coefficient location in a current transform block. The coeff_abs_level is a flag indicating whether a transform coefficient level of greater than a specific value in a scanning position.

Group 5 corresponds to the case that all syntaxes in a block are encoded in the bypass mode.

FIG. 18 is syntax defining a bypass group index for adaptively applying a bypass mode, as an embodiment to which the present invention is applied.

Referring to FIG. 18, it is shown the syntax that applies the bypass mode adaptively using syntax grouping information in a slice unit.

The present invention may transmit a bypass group index for applying the bypass mode in at least one level among a slice header, a picture parameter set or a sequence parameter set. Here, the bypass group index is an index indicating a group of specific syntaxes to which the bypass mode is applied. For example, the five groups described in FIG. 17 may be allocated to bypass group index 0 to 4, respectively. The bypass group index may be used for applying the bypass mode adaptively.

Referring to FIG. 18, a bypass group index is transmitted in a slice header, and it may be determined on which syntax the bypass mode is applied for each block.

In this case, a bypass flag (bypass_flag) indicating whether the bypass mode is applied in a block unit may be transmitted, but the present invention is not limited thereto. Even in the case that a single block is decoded by using the bypass mode, an update of the probability model for each syntax may be performed for not performed according to the corresponding value.

FIG. 19 is a flowchart describing a process of performing bypass mode arithmetic decoding based on a bypass group index, as an embodiment to which the present invention is applied.

A decoder may parse a bypass group index from a bit stream (step, S1910). Here, the bypass group index is an index indicating a group of specific syntaxes to which the bypass mode is applied. For example, the five groups described in FIG. 17 may be allocated to bypass group index 0 to 4, respectively. The bypass group index may be used for applying the bypass mode adaptively.

Meanwhile, the bypass mode may be applied to the syntax elements that correspond to the bypass group index, generally, but the present invention is not limited thereto. For example, even for the syntax elements that correspond to the bypass group index, it may be determined to apply the bypass mode for each specific syntax, again.

For example, the decoder may check the syntax elements that correspond to the bypass group index, and may determine target syntax for applying the bypass mode (step, S1920).

The decoder may receive a bypass flag indicating whether to apply the bypass mode for specific syntax in a level in which the bypass group index is parsed or lower level (step, S1930). For example, the decoder may parse a bypass group index in a slice header, and receive the bypass flag in a block level.

Based on the bypass flag, it may be determined for which syntax the bypass mode is applied in each block, and in the case that the bypass mode is applied, bypass binary arithmetic decoding may be performed for the syntaxes in the corresponding block or for specific syntax (step, S1940).

FIG. 20 is a block relation diagram for describing a method for deriving a bypass mode of a current block, as an embodiment to which the present invention is applied.

As an embodiment of the present invention, a method is proposed for deriving whether the bypass mode is applied for each block in a decoder.

In FIG. 20, it is assumed that the shaded areas are blocks decoded in the bypass mode.

According to the present invention, by using the bypass mode information used in N−1 frame, the bypass mode information of a current block may be derived in N frame. In FIG. 20, it is described to use the bypass mode of N−1 frame, but the present invention is not limited thereto, and the bypass mode of a previous frame may also be used. In addition, the bypass mode information of other block in the same frame, not a frame unit, may also be used, and the bypass mode of a neighboring block may also be used.

As an embodiment, the bypass mode of a co-located block with the block which is intended to be decoded currently may be used without any change.

Alternatively, the bypass mode information of a block in a position indicated by a motion vector of a current block may also be used.

In addition, the embodiments may be performed based on a block size. For example, the embodiments may be applied only in the case that the size (X1, X3) of a corresponding block of a previous frame is the same as or greater than a current block (C1, C3). that is, in the case that the size of the corresponding block X2 of the previous frame is smaller than that of the current block C2, the bypass mode flag value may not be used.

FIG. 21 is syntax for a bypass temporal prediction flag indicating whether a bypass flag is predicted from a previous frame, as an embodiment to which the present invention is applied.

The present invention proposes a method of defining a bypass temporal prediction flag in a slice level. The bypass temporal prediction flag indicates whether a bypass flag is predicted from a previous frame.

For example, the bypass temporal prediction flag may be represented by bypass_temporal_pred_flag. When bypass_temporal_pred_flag=1, a current slice may predict a bypass flag from the previous frame, and when bypass temporalpred_flag=0, the current slice does not predict a bypass flag from the previous frame.

The decoder may obtain the bypass temporal prediction flag in a slice header unit, and accordingly, it may be determined whether a bypass flag is predicted from the previous frame. In this case, the bypass mode flag of the previous frame may be used directly.

Alternatively, in the case that the previous frame is a frame that does not use the bypass mode, a bypass mode flag value may be derived through calculating an actual generation probability.

In addition, in the case that the bypass temporal prediction flag is used, the syntax for the bypass mode may not be transmitted in a block unit.

FIG. 22 is a flowchart describing a process of performing bypass mode arithmetic decoding based on a bypass temporal prediction flag, as an embodiment to which the present invention is applied.

The present invention proposes a method of deriving a bypass flag from a previous frame based on a bypass temporal prediction flag, and performing bypass mode arithmetic decoding by using it.

A decoder may parse a bypass temporal prediction flag from a bit stream (step, S2210). In this case, the bypass temporal prediction flag may be obtained from a slice header, but the present invention is not limited thereto, and may be obtained from at least one of a sequence parameter set, a picture parameter set, a frame, a slice, a coding tree unit, a coding unit, a prediction unit, a transform unit or a block.

In the case that a bypass flag is derived from a previous slice (or previous frame) according to the bypass temporal prediction flag, the decoder may derive a corresponding block of a previous slice (or previous frame) (step, S2220). Here, the corresponding block may mean a co-located block with a current block. Alternatively, the corresponding block may mean a block indicated by a motion vector of the current block.

For example, when bypass_temporal_pred_flag=1, the decoder may derive a corresponding block from a previous frame or a previous slice, and when bypass_temporal_pred_flag=0, the decoder does not derive a corresponding block from a previous frame or a previous slice.

As an example, the decoder may determine whether to derive a corresponding block of a previous slice (or previous frame) based on a block size. For example, in the case that a prediction block of the corresponding block is the same or greater than a prediction block of a current block, the information of the corresponding block may be used. In the case that a prediction block of the corresponding block is the smaller than a prediction block of a current block, the information of the corresponding block may not be used.

The decoder may derive a bypass flag of the corresponding block, and may determine whether to apply the bypass mode for the current block based on the bypass flag value (step, S2230).

In the case that the bypass mode is applied to the current block according to the bypass flag, the decoder may perform bypass binary arithmetic decoding for the current block, and otherwise, the decoder may perform arithmetic decoding according to the regular mode (step, S2240).

As described above, the embodiments described in the present invention may be implemented in a computer, processor, micro-processor, controller or chip and performed. For example, the function units shown in FIGS. 1 to 14 may be implemented in a computer, processor, micro-processor, controller or chip and performed.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of performing an entropy decoding for a video signal, comprising:
    obtaining a difference value between a context model initial value for a current slice and a context model initial value for a previous slice, wherein the difference value is obtained for each syntax element;
    obtaining the context model initial value for the current slice based on the difference value;
    calculating a probability value based on syntax statistics of the previous slice;
    deriving weighted values corresponding to the context model initial value for the current slice and the syntax statistics of the previous slice; and
    updating the context model initial value for the current slice using the weighted values;
    deriving a context model for syntax element from a plurality of neighboring blocks; and
    performing an entropy decoding using the context model, wherein the content model is derived based on (i) a summation of syntax values of the neighboring blocks and (ii) a comparison between a block size of the current block and block sizes of the neighboring blocks.

2. The method of claim 1, further comprising:
    obtaining, from the video signal, an update flag indicating whether to perform update for a context model,
    wherein the context model initial value for the current slice is obtained when the update is performed for a context model according to the update flag.

3. An apparatus for performing an entropy decoding for a video signal, comprising:
    a context modeling unit configured to
    obtain a difference value between a context model initial value for a current slice and a context model initial value for the previous slice, wherein the difference value is obtained for each syntax element
    obtain the context model initial value for the current slice based on the difference value,
    calculate a probability value based on syntax statistics of a previous slice,
    derive weighted values corresponding to the context model initial value for the current slice and the syntax statistics of the previous slice, and
    update the context model initial value for the current slice using the weighted values; and
    a memory configured to store the probability value based on syntax statistics of the previous slice,
    wherein the context modeling is further configured to:
    derive a context model for syntax element from a plurality of neighboring blocks, and
    perform an entropy decoding using the context model, wherein the context model is derived based on (i) a summation of syntax values of the neighboring blocks and (ii) a comparison between a block size of the current block and block sizes of the neighboring blocks.

4. The apparatus of claim 3,
wherein the context modeling unit is further configured to obtain, from the video signal, an update flag indicating whether to perform update for a context model, and
wherein the context model initial value for the current slice is obtained when the update is performed for a context model according to the update flag.

* * * * *